(12) United States Patent
Takahashi et al.

(10) Patent No.: US 11,544,975 B2
(45) Date of Patent: Jan. 3, 2023

(54) VEHICLE CONTROL APPARATUS AND DISPLAY CONTROL METHOD

(71) Applicant: TOYOTA JIDOSHA KABUSHIKI KAISHA, Toyota (JP)

(72) Inventors: Yoshihiko Takahashi, Miyoshi (JP); Keiko Tosaki, Miyoshi (JP); Kohji Itoh, Nagoya (JP); Tomoyoshi Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/869,225

(22) Filed: May 7, 2020

(65) Prior Publication Data
US 2020/0357203 A1    Nov. 12, 2020

(30) Foreign Application Priority Data

May 7, 2019   (JP) .............................. JP2019-087500

(51) Int. Cl.
*B60K 35/00*  (2006.01)
*G07C 5/08*   (2006.01)
*G06T 11/00*  (2006.01)

(52) U.S. Cl.
CPC ............ *G07C 5/0825* (2013.01); *B60K 35/00* (2013.01); *G06T 11/00* (2013.01);
(Continued)

(58) Field of Classification Search
None
See application file for complete search history.

(56) References Cited

U.S. PATENT DOCUMENTS 6,515,684 B1 * 2/2003 Knodt ................ H04N 1/00482
                                                715/810
10,435,032 B2 * 10/2019 Goo .................... B60G 17/0195
(Continued)

FOREIGN PATENT DOCUMENTS

DE   102004009308 A1   9/2005
DE   102007020124 A1   11/2007
(Continued)

OTHER PUBLICATIONS

Lee, "Operating device for influencing on-states of e.g. collision warning system, of motor vehicle, has switching elements assigned to assistance system for outputting of warning whose time criticality measure is provided in predetermined areas", DE102007029032A1, Translated copy (Year: 2008).*
(Continued)

*Primary Examiner* — David H Chu
(74) *Attorney, Agent, or Firm* — Hunton Andrews Kurth LLP

(57) ABSTRACT

A vehicle control apparatus includes a second display device which is connected to a driving support ECU, and a meter ECU. The driving support ECU performs a plurality of diving support functions by executing a plurality of driving support controls. The meter ECU hides an integrated telltale image in a predetermined area of the second display device when all of a plurality of recommended driving support functions selected among the driving support functions have been set in the valid states. The meter ECU displays the integrated telltale image in the predetermined area of the second display device when at least one of the recommended driving support functions which has been set in the invalid state is present.

12 Claims, 10 Drawing Sheets

(52) U.S. Cl.
CPC .... *B60K 2370/12* (2019.05); *B60K 2370/152* (2019.05); *B60K 2370/16* (2019.05); *B60K 2370/18* (2019.05)

(56) References Cited

U.S. PATENT DOCUMENTS

| | | | | |
|---|---|---|---|---|
| 2010/0140070 A1* | 6/2010 | Simard | ................ | G04G 15/006 200/33 R |
| 2010/0325541 A1* | 12/2010 | Imaizumi | ........... | H04N 1/00244 715/708 |
| 2012/0271483 A1* | 10/2012 | Samukawa | ......... | B60W 40/072 701/1 |
| 2013/0038434 A1 | 2/2013 | Ishibashi et al. | | |
| 2013/0219318 A1* | 8/2013 | Schreiber | ............... | B60K 35/00 715/771 |
| 2015/0084777 A1* | 3/2015 | Haber | ................... | G01F 23/292 340/635 |
| 2016/0311323 A1* | 10/2016 | Lee | ........................ | B60K 37/06 |
| 2017/0036694 A1* | 2/2017 | Okuda | ..................... | B62D 6/02 |
| 2017/0109590 A1* | 4/2017 | Gehrke | ................ | H04N 17/002 |
| 2017/0175316 A1* | 6/2017 | Oh | ........................ | A47G 25/20 |
| 2017/0259831 A1* | 9/2017 | Hoshino | ............... | B60W 30/06 |
| 2019/0094856 A1* | 3/2019 | Kawate | .................. | B60K 35/00 |
| 2019/0228537 A1* | 7/2019 | Sekiguchi | ............... | B60R 11/04 |
| 2019/0299783 A1* | 10/2019 | Aminev | .................... | G06F 8/65 |

FOREIGN PATENT DOCUMENTS

| | | |
|---|---|---|
| DE | 102007029032 A1 | 12/2008 |
| DE | 102010047778 A1 | 4/2012 |
| JP | 2011-246048 A1 | 12/2011 |

OTHER PUBLICATIONS

Extended European Search Report issued to corresponding EP Application No. 20170023.4 dated Oct. 13, 2020.

* cited by examiner

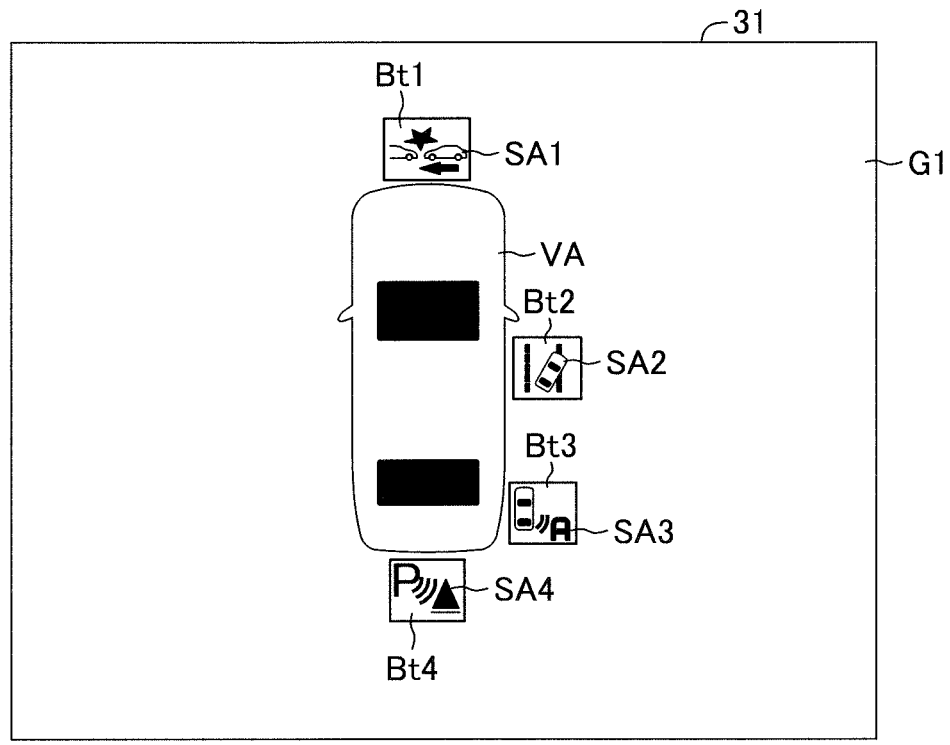
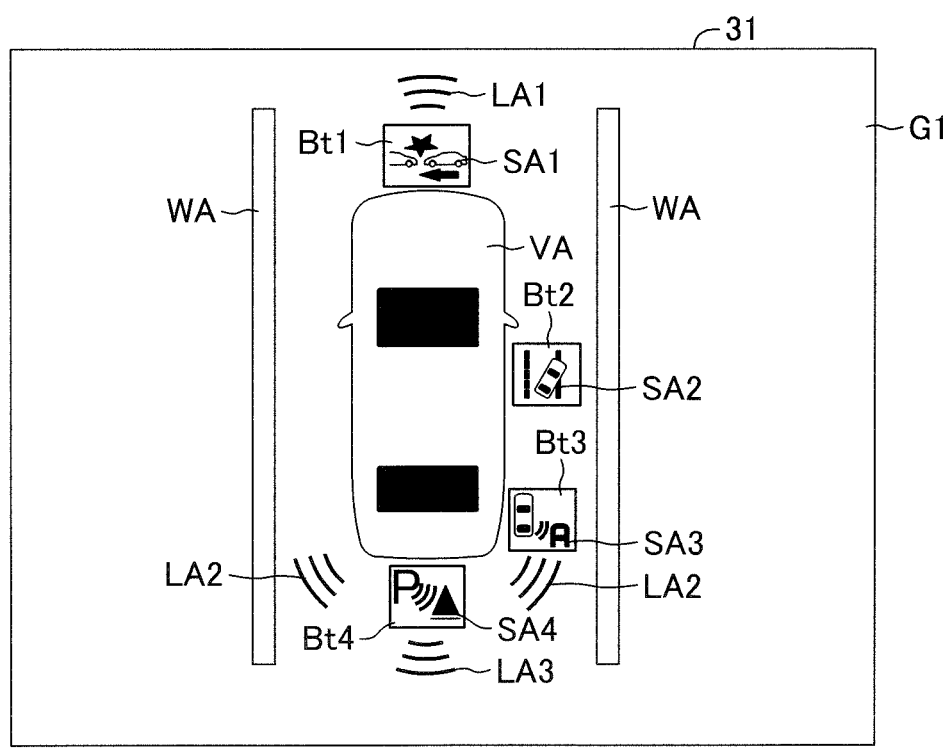
FIG.2

| NON-DISPLAYING CONDITION: ALL OF RECOMMENDED DRIVING SUPPORT FUNCTIONS HAVE BEEN SET IN VALID STATES | DISPLAYING CONDITION: AT LEAST ONE OF RECOMMENDED DRIVING SUPPORT FUNCTIONS WHICH HAS BEEN SET IN INVALID STATE IS PRESENT |

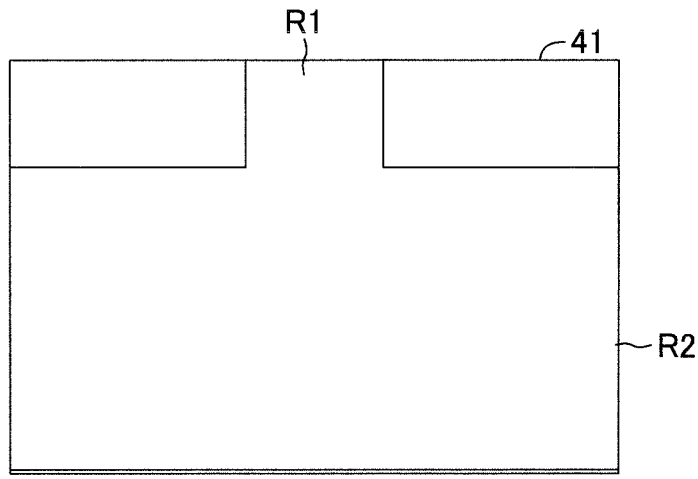
FIG.4A TIME POINT t1
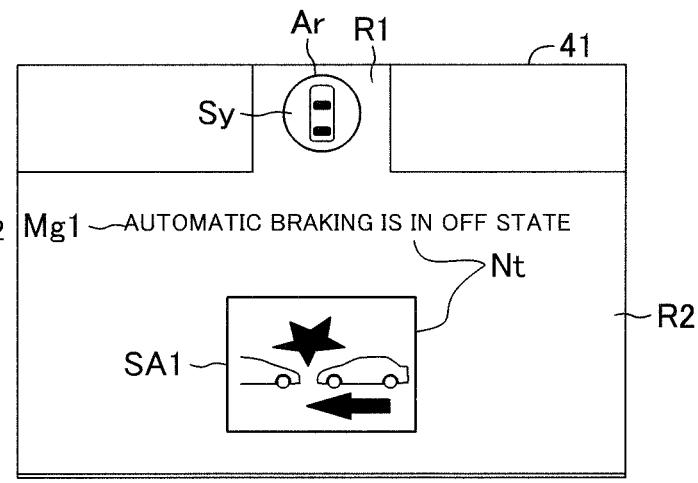
FIG.4B TIME POINT t2
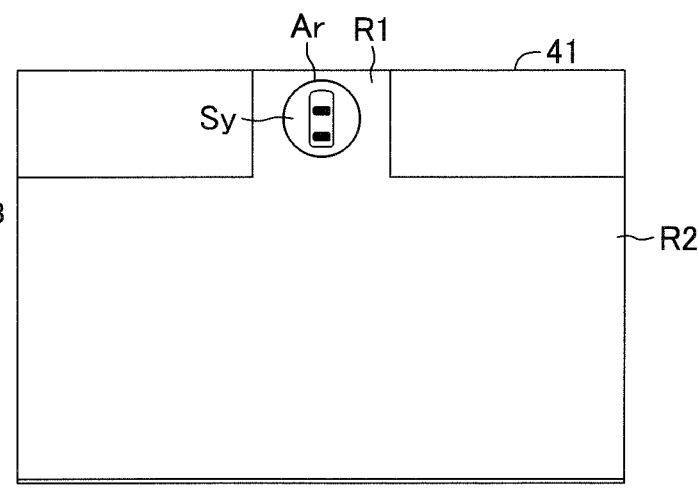
FIG.4C TIME POINT t3

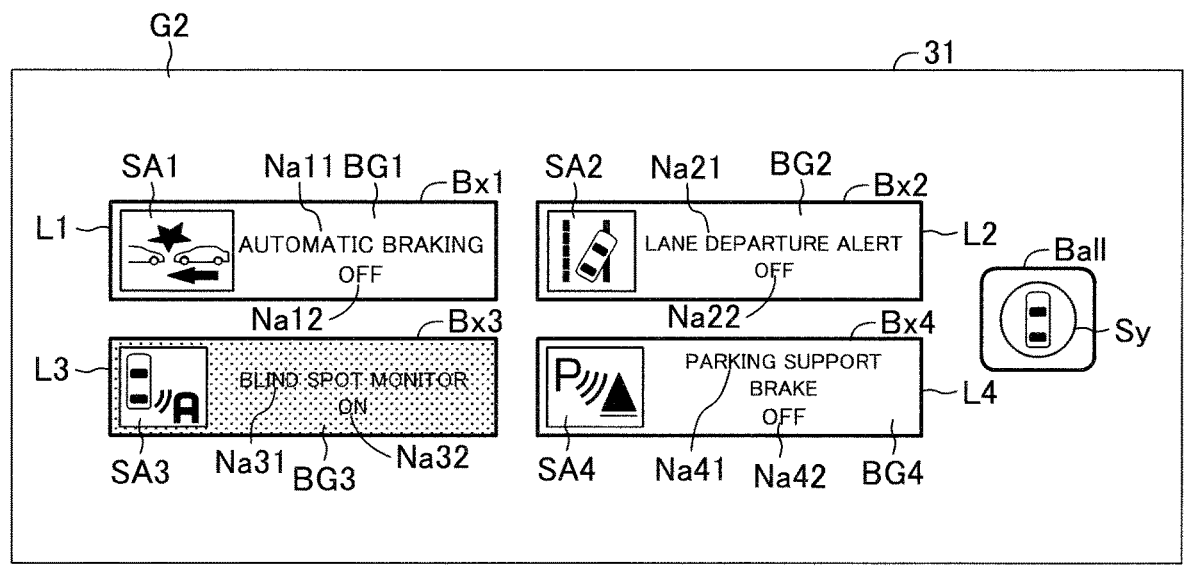
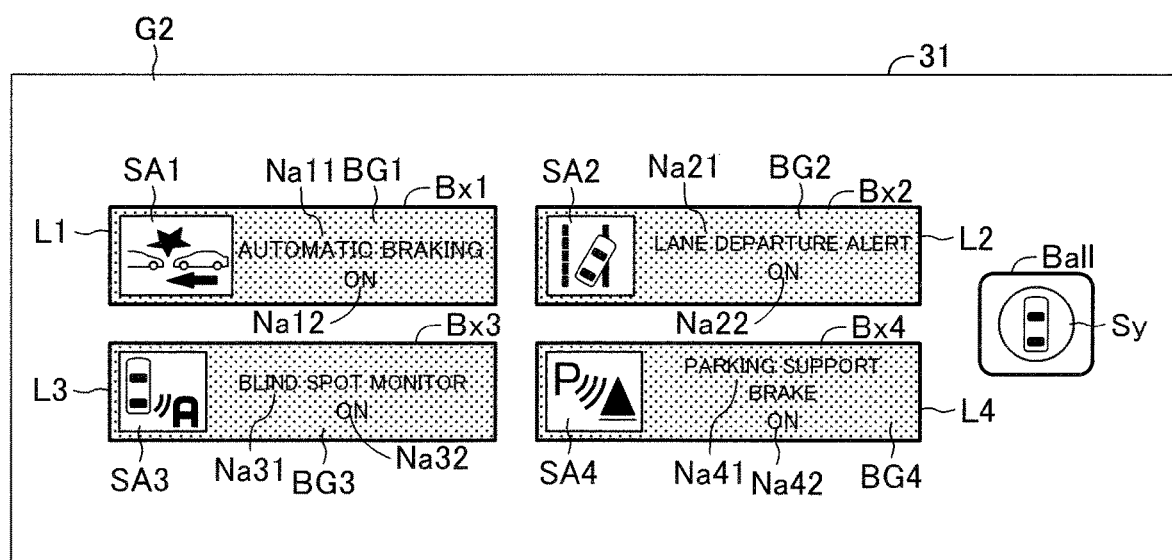
FIG.5

VEHICLE CONTROL APPARATUS AND DISPLAY CONTROL METHOD

CROSS-REFERENCE TO RELATED APPLICATION

The present application claims priority to Japanese Patent Application No. 2019-087500 filed on May 7, 2019, which is incorporated herein by reference in its entirety.

BACKGROUND OF THE INVENTION

1. Field of the Invention

The present invention relates to a vehicle control apparatus and a display control method, for displaying "graphic symbols, a group of characters, and the like" on a display device in order to have a user (for example, a driver) of a vehicle recognize a setting state of each of driving support functions (whether or not the setting state is either a valid state and an invalid state).

2. Description of the Related Art

There has been a known display device (hereinafter, referred to as a "conventional device") configured to display information on a state of a vehicle.

The conventional device displays a graphic symbol representing information on the state (for example, abnormality/failure in an electronic control of an engine) of the vehicle on a first display, and displays an image related to that information (that graphic symbol) on a second display (refer to Japanese Patent Application Laid-Open No. 2011-246048).

The vehicle is equipped with driving support devices. The driving support devices perform a plurality of driving support functions (for example, an automatic braking control, a blind spot monitor control, a lane departure alert control, a parking support brake control, a lane keeping control, and a following-travel inter-vehicle-distance control). In many cases, each of the driving support functions can be set by a user of the vehicle to either a valid state where its function is allowed to be performed or an invalid state where its function is not allowed to be performed. It is not easy for the user of the vehicle having the various driving support functions to recognize whether or not each of the states of the driving support functions is either the valid state or the invalid state.

SUMMARY OF THE INVENTION

The present invention has been made in order to cope with the above-described problem. That is, an object of the present invention is to provide a "vehicle control apparatus and a display control method" capable of having a user of a vehicle easily recognize whether or not all of recommended driving support functions have been set at/in the valid states. The recommended driving support functions are recommendable to be set at/to the valid states among all of driving support functions of the vehicle. Hereinafter, the vehicle control apparatus according to the present invention may sometimes be referred to as "the present invention control apparatus" and the display control method according to the present invention may sometimes be referred to as "the present invention control method".

The present invention control apparatus comprises:
a driving support device (10) configured to perform a plurality of driving support functions for a vehicle;
a display device (31, 41); and
a display control device (30, 40), The driving support device is configured to be capable of setting individually each of some or all of the driving support functions to either a valid state or an invalid state, wherein one of the driving support functions is allowed to perform a corresponding driving support function when that one of the driving support functions is set in the valid state, and one of the driving support functions is not allowed to perform the corresponding driving support function when that one of the driving support functions is set in the invalid state.

The display control device is configured to:
display an integrated telltale image including a specific graphic symbol (Sy in FIGS. 3, 4B, and 4C) on the display device in a first display mode (refer to step 715) when at least one of recommended driving support functions has been set in the invalid state, the recommended driving support functions including at least two of all of the driving support functions each of which can be set in either the valid state or the invalid state (refer to a "No" determination at step 705); and
hide the integrated telltale image or display the integrated telltale image in a second display mode that is different from the first display mode on the display device (refer to step 710), when all of the recommended driving support functions have been set in the valid states (refer to a "Yes" determination at step 705).

According to the present invention control apparatus, when at least one of the recommended driving support functions which has been set in (at, to) the invalid state is present, the integrated telltale image is displayed on the display device in the first display mode. In addition, according to the present invention control apparatus, when all of the recommended driving support functions have been set in (at, to) the valid states, the integrated telltale image is displayed, on the display device, in the second display mode which is different from the first display mode or is hidden (or is erased/eliminated from the screen of the display device). Thereby, the present invention control apparatus can cause (or allows) the user to easily recognize whether or not all of the recommended driving support functions have been set in (at, to) the valid states. The recommended driving support functions are recommended to have been set in (at, to) the valid states and include at least two of all of the driving support functions which can be performed by the driving support device.

In one of aspects of the present invention control apparatus,
the display control device is configured to display a function invalid state notification image (Nt) on the display device for a predetermined displaying time (refer to step 810), when one of the recommended driving support functions has been switched from the valid state to the invalid state (refer to a "Yes" determination at step 805).

The function invalid state notification image includes:
a graphic symbol (SA1 in FIG. 4B) corresponding to the one of the recommended driving support functions that has been switched to the invalid state; and
a character group (Mg1) representing by characters that the one of the recommended driving support functions that has been switched to the invalid state.

According to the above-described aspect, when one of the recommended driving support functions has been switched to the invalid state, the integrated telltale image is displayed on the display device, and the function invalid state notification image is displayed on the display device for a predetermined period (the predetermined displaying time). Thereby, the above-described aspect can cause (or allows) the user to easily recognize the presence of at least one of the recommended driving support functions which has been set in (at, to) the invalid state and the driving support function which has been set in (at, to) the invalid state. Furthermore, according to the above-described aspect, the graphic symbol corresponding to the recommended driving support function and the character group representing/indicating by characters that the recommended driving support function that has been set in (at, to) invalid state on the display device. Thereby, the above-described aspect can cause (or allows) the user to easily learn what the graphic symbol corresponds to each of the driving support functions.

In one of aspects of the present invention control apparatus, the display control device is configured to display a specific display image on the display device, the specific display image including:

a batch operation button (Ball) to be operated in order for a user of the vehicle to switch each of all of the recommended driving support functions to the valid state, the batch operation button including at least one of the specific graphic symbol and another specific graphic symbol reminding the user of the specific graphic symbol; and function box images (Bx1 to Bx4) corresponding to the respective recommended driving support functions, each of the function box images including:

at least one of:

a first graphic symbol (Sa1, Sa2 Sa3, Sa4) corresponding to one of the recommended driving support functions; and a first character group (Na11, Na21, Na31, Na41) representing by characters the one of the recommended driving support functions; and at least one of:

a second character group (Na12, Na22, Na32, Na42) representing by characters indicating whether the one of the recommended driving support functions is either in the valid state or in the invalid state; and a second graphic symbol indicating whether the one of the recommended driving support functions is either in the valid state or in the invalid state.

According to the above-described aspect, the batch operation button includes the specific symbol configuring the integrated telltale image or the other specific symbol reminding the user of the specific symbol. Thereby, the above-described aspect can cause (or allows) the user to easily recognize that the batch operation button is the button for switching a comprehensive setting state of the recommended driving support functions. Furthermore, according to the above-described aspect, the batch operation button and the function box images indicating the setting states of the recommended driving support functions respectively together with the batch operation button are displayed on the display device. Thereby, the above-described aspect can cause (or allows) the user to easily learn the recommended driving support functions whose states can be switched by operating the batch operation button.

In one of aspects of the present invention control apparatus, the display control device is configured to:

set, when at least one of the recommended driving support functions is in the valid state, a back ground color of the at least one of the function box images corresponding to the at least one of the recommended driving support functions in the valid state to a first color; and set, when at least one of the recommended driving support functions is in the invalid state, the back ground color of the at least one of the function box images corresponding to the at least one of the recommended driving support functions in the invalid state to a second color different from the first color.

According to the above-described aspect, the user can more easily recognize the setting states of the recommended driving support functions.

In one of aspects of the present invention control apparatus, the display device includes:

a first display device (31); and a second display device (41) separate from the first display device; and the display control device is configured to:

display the batch operation button and the function box images on the first display device; and display the integrated telltale image on the second display device.

In one of aspects of the present invention control apparatus, the display control device is configured to display, on the display device, a plurality of operation buttons (Bt1 to Bt4) to be operated in order for the user to switch each of the recommended driving support functions corresponding to the respective operation buttons to either the valid state or the invalid state, each of the operation buttons including a third graphic symbol which is the same as each of the first graphic symbols included in the function box images corresponding to the respective recommended driving functions.

The above-described aspect can cause (or allows) the user to more easily learn the driving support functions indicated by the graphic symbols corresponding to the recommended driving support functions respectively.

In one of aspects of the present invention control apparatus, the driving support device configured to perform the driving support functions using a sensor (11, 13); and the display control device is configured to display failed function notification contents on the display device (refer to step 1010), the failed function notification contents including:

fourth graphic symbols (SA1, SA2) corresponding to one or more of the recommended driving support functions which cannot be used due to failure of the sensor respectively; and a character group (Mg2) including name of the sensor in failure.

The above-described aspect can cause (or allows) the user to easily recognize one or more of the recommended driving support functions that have been unable to be used due to the failure of the sensor, at a glance.

In one of aspects of the present invention control apparatus, the display control device is configured to display the integrated telltale image in the first display mode on the display device when displaying the failed function notification contents on the display device.

The above-described aspect can cause (or allows) the user to easily recognize that there is at least one of all of the recommended driving support functions that has not been set in (at, to) the invalid state due to the failure of the sensor. It is recommended that the recommended driving support functions are set in (at, to) the valid states.

The present invention control method is performed by one or more processors executing on the display control device (30, 40) and applied to the vehicle (SV), the vehicle including:
the driving support device (10) configured to be capable of:
realizing a plurality of driving support functions; and
individually setting each of some or all of the driving support functions to either a valid state or an invalid state, wherein one of the driving support functions is allowed to perform a corresponding driving support function when that one of the driving support functions is set in the valid state, and one of the driving support functions is not allowed to perform the corresponding driving support function when that one of the driving support functions is set in the invalid state; and
the display device (31, 41).

The present invention control method comprising:
displaying the integrated telltale image including the specific graphic symbol (Sy in FIGS. 3, 4A, and 4B) on the display device in a first display mode (refer to step 715) when at least one of recommended driving support functions has been set in the invalid state (refer to a "No" determination at step 705), the recommended driving support functions including at least two of all of the driving support functions each of which can be set in either the valid state or the invalid state; and
hiding the integrated telltale image or display the integrated telltale image in a second display mode that is different from the first display mode on the display device (refer to step 710), when all of the recommended driving support functions have been set in the valid states (refer to a "Yes" determination at step 705).

Thereby, the present invention control method can cause (or allows) the user to easily recognize whether or not all of the recommended driving support functions have been set in (at, to) the valid states.

In the above description, the terms and/or the reference symbols used in the following description regarding embodiment are added with parentheses to the elements of the present invention control apparatus and the present invention control method, in order to assist in understanding the present invention. However, the terms and/or reference symbols should not be used to limit the scope of the invention.

BRIEF DESCRIPTION OF DRAWINGS

FIG. 2 is a diagram for explaining information displayed on a first display device.

FIG. 4A is a diagram for explaining information displayed on the second display device.

FIG. 4B is a diagram for explaining information displayed on the second display device.

FIG. 4C is a diagram for explaining information displayed on the second display device.

FIG. 5 is a diagram for explaining information displayed on the first display device.

DETAILED DESCRIPTION OF THE EMBODIMENT

Configuration

A vehicle control apparatus (hereinafter, also referred to as a "present apparatus") according to an embodiment of the present invention is applied to a vehicle SV. The present apparatus includes a driving support control apparatus, a display device, and a display control device.

Figure 1:
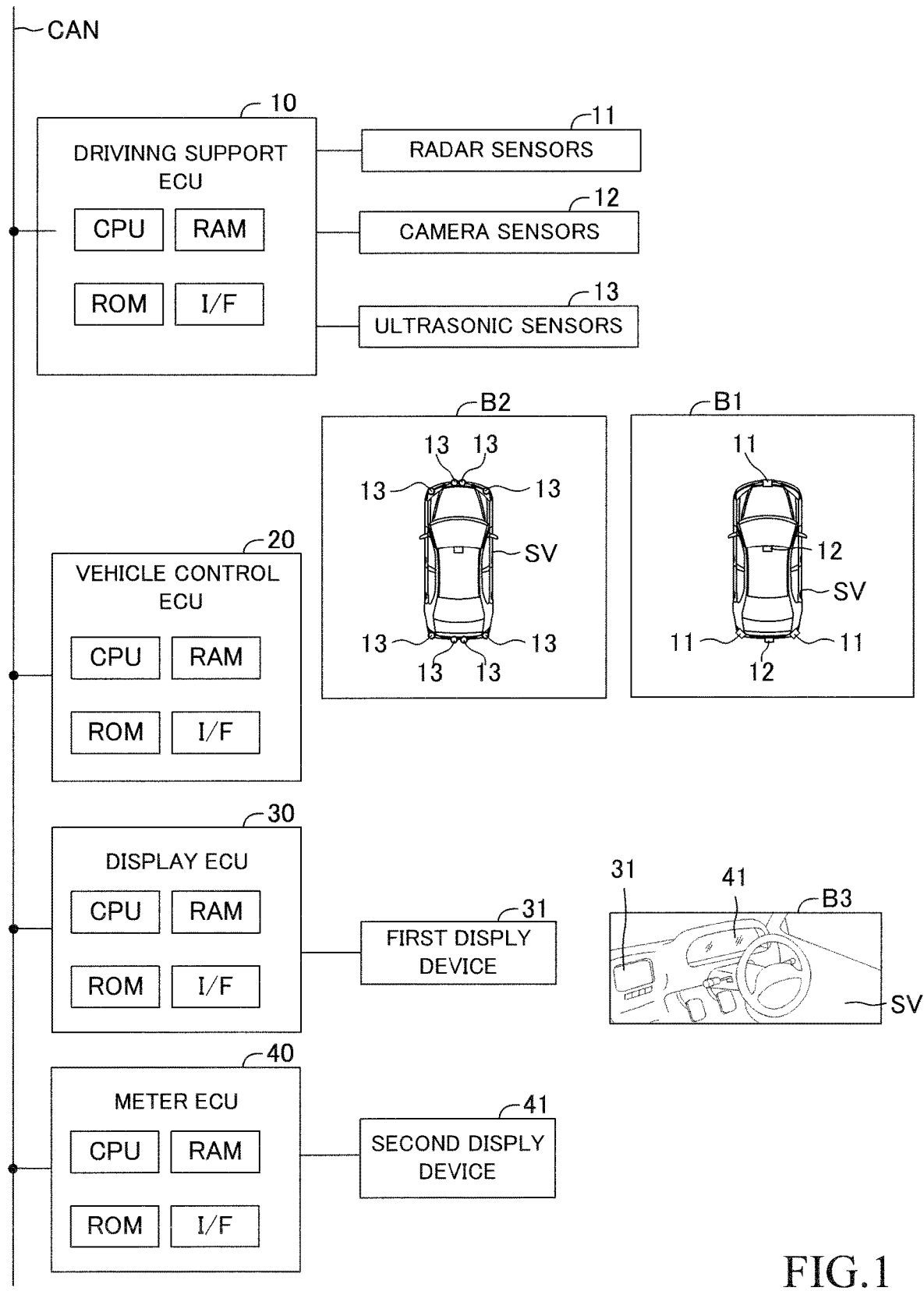
FIG. 1 is a schematic configuration diagram illustrating a vehicle control apparatus according to an embodiment of the present invention.

More specifically, as shown in FIG. 1, the present apparatus includes a driving support ECU 10, a vehicle control ECU 20, a display ECU 30, and a meter ECU 40. It should be noted that, hereinafter, the driving support ECU 10 is referred to as a "DSECU". The DSECU is an ECU corresponding to the driving support apparatus. It should be noted that the "ECU" means an electronic control unit.

Each of those ECUs includes a microcomputer. The microcomputer includes a CPU, a ROM, a RAM, a readable and writable non-volatile memory, and an interface I/F. The CPU realizes various functions by executing instructions (programs, routines) stored in the ROM. Furthermore, the ECUs are connected with each other via a CAN (Controller Area Network) so that they are capable of mutually exchanging data (communicable). Therefore, a detection signal detected by a sensor (or a switch) which is connected to a certain ECU can be transmitted to at least one of the ECUs other than the certain ECU. Some of the ECUs or all of the ECUs may be integrated into a single ECU. In particular, the display ECU 30 and the meter ECU 40 are the ECUs corresponding to the display control device and may be integrated to a single ECU.

The DSECU is connected to a plurality of radar sensors 11, a plurality of camera sensors 12, and a plurality of ultrasonic sensors 13 (also referred to as "clearance sonars").

Each of the radar sensors 11 is a well-known sensor using a radar wave (hereinafter, referred to as a "millimeter wave") which is an electric wave in a millimeter waveband. Each of the radar sensors 11 obtains radar target object information. The radar target object information includes a distance between the vehicle SV and a three-dimensional object present in surroundings of the vehicle SV, a relative speed between the vehicle SV and the three-dimensional object, and a relative position (a direction) of the three-dimensional object with respect to the vehicle SV.

As shown in a block B1 in FIG. 1, the radar sensors 11 are disposed at a center of a front end part of the vehicle SV, a left end of a rear end part of the vehicle SV, and a right end of the rear end part of the vehicle SV, respectively. Therefore, the radar sensors 11 are capable of obtaining the radar target object information of the three-dimensional object present in the surroundings of the vehicle SV (a front area in front of (ahead of) the vehicle SV and a rear area behind the vehicle SV).

Each of the camera sensors 12 photographs (takes an image of) a part of the surroundings (a peripheral area) of the vehicle SV which corresponds to its imaging range to thereby obtain image data (image information), every time a predetermined time elapses.

As shown in a block B1 of FIG. 1, one of the camera sensors 12 is disposed near the top of a center part in a vehicle width direction of a front window glass of the vehicle SV and in a vehicle cabin of the vehicle SV. The other of the camera sensors 12 is disposed at a center of the rear end part in the vehicle width direction. One of the camera sensors 12 can photograph "a part of the surroundings (the peripheral area) in front of (ahead of) the vehicle SV" corresponding to its imaging range. The other of the camera sensors 12 can photograph "a part of the surroundings (the peripheral area) behind the vehicle SV" corresponding to its imaging range. Each of the camera sensors 12 generates "camera target object information" based on the obtained image data. The camera target object information includes a type of a target object which is present in the surroundings of the vehicle SV, a position of the target object, positions and types of lane markers (white lines) of a traveling lane of the vehicle SV, and a distance between the vehicle SV and the lane marker.

Each of the ultrasonic sensors 13 is a well-known sensor using an ultrasonic wave. Each of the ultrasonic sensors 13 radiates the ultrasonic wave to a predetermined radiation area and receives a reflected wave which is the radiated wave reflected by the three-dimensional object. Each of the ultrasonic sensors 13 determines whether or not the three-dimensional object is present. If the three-dimensional object is present, each of the ultrasonic sensors 13 detects/calculates the distance between the vehicle SV and the three-dimensional object based on a time length from radiation of the ultrasonic wave to reception of the reflected wave.

As shown in a block B2 of FIG. 1, the ultrasonic sensors 13 are disposed at positions shown in the block B2, respectively. Those positions are a left end of the front end part of the vehicle SV, two center parts in a center area of the front end part of the vehicle SV, a right end of the front end part of the vehicle SV, the left end of the rear end part of the vehicle SV, two center parts in a center area of the rear end part of the vehicle SV, and the right end of the rear end part of the vehicle SV. Therefore, the ultrasonic sensors 13 can obtain information on the distance of the three-dimensional object which is present within the front area of the vehicle SV and the rear area of the vehicle SV.

The DSECU recognizes a peripheral situation of the vehicle SV based on the information (data) sent from each of the radar sensors 11, the camera sensors 12, and the ultrasonic sensors 13 and performs various driving support controls which are well known and are described later, based on the recognized peripheral situation of the vehicle SV.

The vehicle control ECU 20 is connected to various sensors (not shown) in order to detect a state of the vehicle SV represented by a vehicle speed of the vehicle SV, an acceleration of the vehicle SV, a yaw rate of the vehicle SV, and the like and receives each of detection values detected by those various sensors. Furthermore, the vehicle control ECU 20 is connected to each of various ECUs (not shown) such as an engine ECU, a brake ECU, and an electric power steering ECU (an EPS ECU) and sends/transmits an instruction to those ECUs to thereby be able to control motion of the vehicle SV.

That is, the vehicle control ECU 20 sends/transmits the instruction to each of those various ECUs to control actuators (not shown) connected to each of those various ECUs. Thereby, the vehicle control ECU 20 can control operation of each of an engine (an internal combustion engine) which is unillustrated, an electric power steering, a brake, and the like. Thereby, the vehicle control ECU 20 changes/adjusts steering of the vehicle SV, a driving force of the vehicle SV, a braking force of the vehicle SV, and the like to thereby be able to control the motion of the vehicle SV.

The display ECU 30 is connected to a first display device 31 included in the vehicle SV. Images (characters (character images), figures (figure images), and the like) to be displayed on the first display device 31 are stored in the ROM of the display ECU 30. The display ECU 30 generates drawing data for generating a first display image to be displayed on the first display device 31 based its stored images; and information which is other than its stored images and is necessary for generating the first display image. The display ECU 30 generates the first display image to be displayed on the first display device 31 to display the generated first display image on the first display device 31. It should be noted that in this specification, the figures (figure images) include lines (line images), points (point images), pictures (picture images), and the like.

As shown in a block B3 in FIG. 1, the first display device 31 is a touchscreen type display (in this embodiment, a touchscreen type liquid crystal display) which is disposed substantially at the center in a width direction of an instrument panel. It should be noted that in this embodiment, the first display device 31 is the touchscreen type display included in a navigation device (not shown), but may be another touchscreen type display independent of the navigation device.

One or more of buttons configured by respective specific images are displayed on the first display device 31. The user taps/touches the button displayed on the first display device 31 to thereby operate the button. It should be noted that the operation is referred to as "touch operation" or "tapping". The touch operation to the button displayed on the display device 31 is transformed into (generates) an operation signal or an instruction signal corresponding to that touch operation. The DSECU receives the generated operation/instruction signal from the display device 31.

The meter ECU 40 is connected to a second display device 41 included in the vehicle SV. As shown in a block B3 in FIG. 1, the second display device 41 is a touchscreen type display (in this embodiment, a touchscreen type crystal display) disposed at a position of the instrument panel in front of a driver seat (not shown).

Images (characters (character images), figures (figure images), and the like) to be displayed on the second display device 41 are stored in the ROM of the meter ECU 40. The meter ECU 40 generates drawing data for generating a second display image to be displayed on the second display device 41 based on its stored images; and information which is other than its stored images and is necessary for generating the second display image. The meter ECU 40 generates the second display image to be displayed on the second display device 41 based on the drawing data to display the generated second display image on the second display device 41. More specifically, the meter ECU 40 generates "a meter image representing the vehicle speed, an engine rotational speed, and the like", and various information (various images), and displays the generated meter images and the information on the display device 41.

Outline of Operation

Outline of Driving Support Control

The present apparatus has driving support functions to perform the driving support controls. Specifically, the DSECU of the present apparatus performs, as the driving support controls, an automatic braking control, a blind spot monitor control, a lane departure alert control, a parking support brake control (an intelligent clearance sonar) and other driving support controls. It should be noted that, hereinafter, the blind spot monitor control is referred to as a "BSM control" and the parking support brake control is referred to as a "PSB control".

The automatic braking control is a well-known control performed in order for the vehicle SV to prevent the vehicle from colliding with an obstacle when it is determined that the vehicle SV is highly likely to collide with the obstacle. More specifically, the DSECU specifies, as an obstacle, the target object located in the surroundings of the vehicle SV based on the radar target object information and the camera target object information. Furthermore, the DSECU determines whether or not the specified obstacle is highly likely to collide with the vehicle SV and performs the automatic braking control based on the determination result. The automatic braking control includes a well-known alert control for alerting a driver of the vehicle SV and a well-known collision prevention control (an automatic braking control) for preventing the vehicle SV from colliding with the obstacle. It should be noted that one of the radar sensors 11 on the front side of the vehicle SV and one of the camera sensors 12 on the front side of the vehicle SV are collectively referred to as "front sensors" in some cases.

The lane departure alert control is a well-known control performed to alert the driver when it is determined that the vehicle SV is likely to deviate from the traveling lane based on the information on "lane markers of the lane (the traveling lane) on which the vehicle SV is traveling" included in the camera target object information obtained (recognized) by one of the camera sensors 12 on the front side of the vehicle SV.

The BMS control is a well-known control to alert the driver of the vehicle SV when it is determined that other vehicle (the obstacle) is present within blind spot areas which are not reflected in left and right side mirrors of the vehicle SV, based on the radar target object information obtained by the radar sensors 11 which are respectively disposed at the left end of the rear end part and the right end of the rear end part of the vehicle SV. It should be noted that examples of alerting the driver by the BSM control are blinking indicator (not shown), generating an alerting sound, and the like.

The PSB control is a well-known control to suppress/limit the driving force when the vehicle SV starts running/moving when it is detected that the three-dimensional object (for example, a wall) is present in a traveling longitudinal direction of the vehicle SV based on the information on the three-dimensional object obtained by the ultrasonic sensors 13, and to generate the braking force if the distance between the three-dimensional object and the vehicle SV becomes excessively short.

In addition, the DSECU is configured to perform driving support controls (driving support controls other than the above-described driving support controls) including a well-known lane keeping control referred to as a lane tracing assist (LTA) and a well-known following-travel inter-vehicle-distance control referred to as an adaptive cruise control (ACC).

Outline of Display Control

Main Setting Screen

When a predetermined operation to the vehicle SV (for example, an operation for changing a position of a start switch of the vehicle SV from an OFF position to an ON position) is performed by the user of the vehicle SV, the display ECU 30 generates images (the first display image) configuring a main setting screen G1 and displays the generated images on the first display device 31. The main setting screen G1 includes the buttons to be tapped by the user, in order for the user to set each of the driving support functions to either a valid state or an invalid state.

It should be noted that when a certain driving support function has been set in (at, to) the valid state, execution of the driving support control corresponding to the certain driving support function in the valid state is permitted. When a certain driving support function has been set in (at, to) the invalid state, the execution of the certain driving support function in the invalid state is not permitted (i.e., is prohibited). Here, an automatic braking function corresponds to the automatic braking control, a lane departure alert function corresponds to the lane departure alert control, a BMS function corresponds to the BMS control, a PSB function corresponds to a PSB control, and other driving support functions correspond to the respective driving support controls.

An upper diagram in FIG. 2 illustrates the main setting screen G1 of when all of the automatic braking function, the lane departure alert function, the BMS function, and the PSB function have been set in (at, to) the invalid states. A lower diagram in FIG. 2 illustrates the main setting screen G1 of when all of the automatic braking function, the lane departure alert function, the BMS function, and the PSB function have been set in (at, to) the invalid states. It should be noted that images (the buttons, the figures, and the like) on the other driving support controls are omitted in the upper diagram and the lower diagram of FIG. 2.

The main setting screen G1 includes a vehicle image VA and first to fourth buttons Bt1 to Bt4 disposed at predetermined positions around the vehicle image VA. The vehicle image VA is a polygon indicative of a shape of the vehicle SV.

The first button Bt1 corresponds to the automatic braking function, the second button Bt2 corresponds to the lane departure alert function, the third button Bt3 corresponds to the BMS function, and the fourth button Bt4 corresponds to the PSB function.

The first button Bt1 is configured by a first icon image SA1 using figures (graphic symbols) that remind the user of the automatic braking function (or that imply or are suggestive of the automatic braking function to the user). When the first button Bt1 is tapped in a case where the automatic braking function has been set in (at, to) the valid state, the DSECU switches the automatic braking function from the valid state to the invalid state. When the first button Bt1 is tapped in a case where the automatic braking function has been set to the invalid state, the DSECU switches the automatic braking function from the invalid state to the valid state.

In these cases, the display ECU 30 controls the first display image to be displayed on the first display device 31, as describe below. That is, when the first button Bt1 is tapped in the main setting screen G1 (shown in the upper diagram in FIG. 2) of when the automatic braking function has been set in (at, to) the invalid state, the display ECU 30 displays a first wave image LA1 (e.g., three arcs becoming wider in the upper direction) as shown in the lower diagram in FIG. 2. The first wave image LA1 is a figure resembling/representing a radar wave radiated in a forward direction of the vehicle SV.

Meanwhile, when the first button Bt1 is tapped in the main setting screen G1 (shown in the lower diagram in FIG. 2) of when the automatic braking function has been set in (at, to) the valid state, the display ECU 30 hides (erases/stops) the first wave image LA1 which has been displayed until that time (when the first button Bt1 is tapped). It should be noted that, in the present specification, to hide something means to make something invisible/disappeared).

In this manner, the display ECU 30 switches the display states between a displaying state where the first wave image LA1 is displayed and a non-display where the first wave image LA1 is not displayed, depending on the setting state of the automatic braking function. Thereby, the user can intuitively recognize/determine whether the automatic braking function is in the valid state or in the invalid state. Accordingly, the user can learn (memorize) that the first button Bt1 is the button for operating/switching the setting states of the automatic braking function and the first icon image SA1 represents (corresponds to) the automatic braking function.

The second button Bt2 is configured by a second icon image SA2 using figures (graphic symbols) that remind the user of the lane departure alert function (or that imply or are suggestive of the lane departure alert function to the user). When the second button Bt2 is tapped in a case where the lane departure alert function has been set in (at, to) the valid state, the DSECU switches the lane departure alert function from the valid state to the invalid state. When the second button Bt2 is tapped in a case where the lane departure alert function has been set in (at, to) the invalid state, the DSECU switches the lane departure alert function from the invalid state to the valid state.

In these cases, the display ECU controls the first display image to be displayed on the first display device 31, as describe below. That is, when the second button Bt2 is tapped in the main setting screen G1 (shown in the upper diagram in FIG. 2) of when the lane departure alert function has been set in (at, to) the invalid state, the display ECU 30 displays lane marker images WA formed by figures resembling/representing the lane markers, as shown in the lower diagram in FIG. 2.

Meanwhile, when the second button Bt2 is tapped in the main setting screen G1 (shown in the lower diagram in FIG. 2) of when the lane departure alert function has been set in (at, to) the valid state, the display ECU 30 hides (erases/stops) the lane marker images WA which have been displayed until that time (when the second button Bt2 is tapped). Therefore, the user can learn (memorize) that the second button Bt2 is the button for operating/switching the setting states of the lane departure alert function and the second icon image SA2 represents (corresponds to) the lane departure alert function.

The third button Bt3 is configured by a third icon image SA3 using figures (graphic symbols) that remind the user of the BMS function (or that imply or are suggestive of the BMS function to the user). When the third button Bt3 is tapped in a case where the BMS function has been set in (at, to) the valid state, the DSECU switches the BMS function from the valid state to the invalid state. When the third button Bt3 is tapped in a case where the BMS function has been set in (at, to) the invalid state, the DSECU switches the BMS function from the invalid state to the valid state.

In these cases, the display ECU 30 controls the first display image to be displayed on the first display device 31, as describe below. That is, when the third button Bt3 is tapped in the main setting screen G1 (shown in the upper diagram in FIG. 2) of when the BMS function has been set in (at, to) the invalid state, the display ECU 30 displays second wave images LA2 (e.g., a pair of three arcs becoming wider in the lower right or the lower left directions), as shown in the lower diagram in FIG. 2. One of the second wave images LA2 is a figure resembling/representing the ultrasonic wave radiated in a rear left direction of the vehicle SV from the left corner of the rear end of the vehicle SV. The other of the second wave images LA2 is a figure resembling/representing the ultrasonic wave radiated in a rear right direction of the vehicle SV from the right corner of the rear end of the vehicle SV.

Meanwhile, when the third button Bt3 is tapped in the main setting screen G1 (shown in the lower diagram in FIG. 2) of when the BMS function has been set in (at, to) the valid state, the display ECU 30 hides (erases/stops) the second wave images LA2 which have been displayed until that time (when the third button Bt3 is tapped). Therefore, the user can learn (memorize) that the third button Bt3 is the button for operating/switching the setting states of the BMS function and the third icon image SA3 represents (corresponds to) the BMS function.

The fourth button Bt4 is configured by a fourth icon image SA4 using figures (graphic symbols) that remind the user of the PSB function (or that imply or are suggestive of the PSB function to the user). When the fourth button Bt4 is tapped in a case where the PSB function has been set in (at, to) the valid state, the DSECU switches the PSB function from the valid state to the invalid state. When the fourth button Bt4 is tapped in a case where the PSB function has been set in (at, to) the invalid state, the DSECU switches the PSB function from the invalid state to the valid state.

In these cases, the display ECU 30 controls the first display image to be displayed on the first display device 31, as described below. That is, when the fourth button Bt4 is tapped in the main setting screen G1 of (shown in the upper diagram in FIG. 2) when the PSB function has been set in (at, to) the invalid state, the display ECU 30 displays a third wave image LA3, as shown in the lower diagram in FIG. 2. The third wave image LA3 is a figure resembling/representing the ultrasonic wave radiated in a rear direction of the vehicle SV from the rear end of the vehicle SV.

Meanwhile, when the fourth button Bt4 is tapped in the main setting screen G1 (shown in the lower diagram in FIG. 2) of when the BMS function has been set in (at, to) the valid state, the display ECU 30 hides (erases/stops) the third wave image LA3 which has been displayed until that time (when the fourth button Bt4 is tapped). Therefore, the user can learn (memorize) that the fourth button Bt4 is the button for operating/switching the setting states of the PSB function and the fourth icon image SA4 represents (corresponds to) the PSB function.

Integrated Telltale Image

Figure 3:
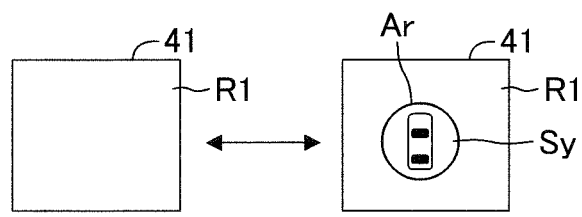
FIG. 3 is a diagram for explaining information displayed on a second display device.

As shown in FIG. 3, when the meter ECU 40 determines that a predetermined condition (a displaying condition)

becomes satisfied, it displays (turns on) an integrated telltale image in/at a predetermined area R1 of the second display device 41. The integrated telltale image Ar is an alert light image (a lamp image for alerting) configured/formed by an integrated symbol figure Sy. In this embodiment, the integrated symbol figure Sy is a figure (a specific graphic symbol) using a vehicle figure resembling/representing the vehicle SV with a circle circumscribing the vehicle figure.

Meanwhile, there are a plurality of specific driving support functions (hereinafter, each referred to as a "recommended driving support function") that form a group of a recommended driving support functions (or a recommended driving support function group) which will be described later in detail. When all of the "recommended driving support functions" have been set in (at, to) the valid states, the meter ECU 40 turns off (hides/deletes) the integrated telltale image Ar (refer to the left side of FIG. 3). Note that, in this case, although the meter ECU 40 does not display the integrated telltale image Ar, it can be said that the meter ECU 40 displays the integrated telltale image Ar in a second display mode, for the sake of convenience.

The recommended driving support function group is formed of (or includes) the driving support functions (the recommended driving support functions) that include some of the driving support functions that can be executed/performed by the DSECU. In this embodiment, the recommended driving support function group includes "the automatic braking function, the lane departure alert function, the BMS function, and the PSB function", because letting/having those functions be set in (at, to) the valid states are recommended, from safety view points.

When at least one of the recommended driving support functions has been set in (at, to) the invalid state, the meter ECU 40 displays (turns on) the integrated telltale image Ar in the predetermined area R1. In other words, in this case, the meter ECU 40 displays the integrated telltale image Ar in a first display mode.

In this manner, the meter ECU 40 controls/switches the displaying states of the integrated telltale image Ar between the state (displaying state) where the integrated telltale image Ar is displayed and the state (undisplayed state) where the integrated telltale image Ar is not displayed, to thereby notify (alert) the user that at least one of the recommended driving support functions which has been set in (at, to) the invalid state is present. Thereby, the user can easily recognize the presence of at least one of the recommended driving support functions which has been set in (at, to) the invalid state. In other words, the user can easily recognize, based on the integrated telltale image Ar, that not all of the driving support functions have been set in (at, to) the valid states.

Alternatively, the meter ECU 40 may blink the integrated telltale image Ar (i.e., the meter ECU 40 displays the integrated telltale image Ar in a first display mode) when at least one of the recommended driving support functions has been set in (at, to) the invalid state, and the meter ECU 40 may continue displaying the integrated telltale image Ar (i.e., the ECU 40 displays the integrated telltale image Ar in a second display mode) when all of the recommended driving support functions have been set in (at, to) the valid states.

Further alternatively, the meter ECU 40 may display the integrated telltale image Ar in a predetermined specific first color (for example, red) in the predetermined area R1 (i.e., the meter ECU 40 displays the integrated telltale image Ar in the first display mode) when at least one of the recommended driving support functions has been set in (at, to) the invalid state, and the meter ECU 40 may display the integrated telltale image Ar in a predetermined specific second color (for example, blue) different from the predetermined specific first color in the predetermined area R1 (i.e., the meter ECU 40 displays the integrated telltale image Ar in the second display mode) when all of the recommended driving support functions have been set in (at, to) the valid states.

Furthermore, the integrated telltale image Ar may be configured to be displayed using an unillustrated light source (for example, a backlight). More specifically, when the light source is turned on to emit a light, the light is transmitted through the integrated symbol figure Sy so that the integrated telltale image Ar is displayed (become visible). In this configuration, the control of the displaying states of the integrated telltale image Ar between the displaying state and the undisplayed state is carried out by switching the light source between the turning-on state and the turning-off state.

As described the above, the present apparatus notifies (alerts) the user of a comprehensive setting state of the recommended driving support functions by changing the display mode of the integrated telltale image Ar. Thereby, the present apparatus can cause (or allows) the user to easily understand/recognize the setting states of the recommended driving support functions.

It should be noted that, in the above example, the recommended driving support function group includes a part of all of the driving support functions that can be executed by the DSECU, however, the recommended driving support function group may include all of the driving support functions that can be executed by the DSECU. Furthermore, the recommended driving support function group may include specific driving support functions that the user can select among all of the driving support functions, rather than the predetermined driving support functions. The number of the driving support functions that the user can select as the recommended driving support functions forming the recommended driving support function group may be changed by the user as appropriate.

Function Invalid State Notification Image

A modified example of the meter ECU 40 displays the integrated telltale image Ar in the predetermined area R1 of the second display device 41, and displays a function invalid state notification image Nt in a predetermined area R2 of the second display device 41 for a predetermined time (for a predetermined period), when one of the recommended driving support functions that has been at the valid state is set/switched to the invalid state from the valid state in a case where all of the recommended driving support functions have been set at the valid states.

As shown in FIG. 4B, an example of the function invalid state notification image Nt includes a message Mg1 and an icon image (a first icon image SA1 in the example shown in FIG. 4B) corresponding to the driving support function which has been switched to the invalid state, The message Mg1 includes a group of characters/letters representing/describing the driving support function (the automatic braking function shown in the example in FIG. 4B) which has been set in (at, to) the invalid state.

For example, at a certain time point t1, when all of the recommended driving support functions have been set at/in the valid states, the meter ECU 40 dose not display the integrated telltale image Ar in the predetermined area R1, as shown in FIG. 4A. Furthermore, the meter ECU 40 does not display the function invalid state notification image Nt in the predetermined area R2 at the certain time point t1.

In this modified example, at a time point t2 after the time point t1, the user taps "the first button Bt1 in the main setting screen G1 (refer to FIG. 2)" to thereby set/switch the automatic braking function to the invalid state from the valid state. In this case, the meter ECU 40 displays the integrated telltale image Ar in the predetermined area R1 and displays the function invalid state notification image Nt in the predetermined area R2, as shown in FIG. 4B.

At a time point t3 at which the predetermined time elapses from the time point t2, the meter ECU 40 hides the function invalid state notification image Nt, as shown in FIG. 4C. In this case, the meter ECU 40 continues displaying the integrated telltale image Ar.

In this manner, the modified example of the meter ECU 40 displays (lights) the integrated telltale image Ar in the predetermined area R1 if at least one of the recommended driving support functions which has been set at the invalid state is present. Furthermore, when one of the recommended driving support functions has been switched from the valid state to the invalid state, the meter ECU 40 displays a message that can identify which the function has been switched to the invalid state in the predetermined area R2 for the predetermined time.

Therefore, the user can recognize at a glance the presence of the recommended driving support function which has been switched to the invalid state and (the type of) the recommended driving support function which has been switched to the invalid state. Furthermore, since the recommended driving support function which has been switched to the invalid state is notified using/by the group of characters/letters with the icon image, the user can learn (memorize) the recommended driving support function corresponding to the icon image (i.e., the user can learn what icon image corresponds to what recommended driving support function).

It should be noted that the function invalid state notification image Nt may include the integrated symbol figure Sy. In this case, the integrated telltale image Ar may be displayed at a position that is the same as or is different from the position at which the function invalid state notification image Nt is displayed. Furthermore, in this case, the function invalid state notification image Nt may be a figure (for example, a figure similar to the integrated symbol figure Sy) that reminds the user of the integrated symbol figure Sy (or that implies or is suggestive of the integrated symbol figure Sy to the user), in place of the integrated symbol figure Sy itself.

Batch Setting Screen G2

When a predetermined operation is performed by the user (for example, when the user touches a button for displaying a batch setting screen G2 shown in FIG. 5, the button being included in the main setting screen G1), the display ECU 30 generates a display image for forming the batch setting screen G2 and displays the generated display image on the first display device 31.

As shown in FIG. 5, the batch setting screen G2 includes function boxes (i.e., the first function box Bx1 to the fourth function box Bx4) corresponding to all of the respective recommended driving support functions, and one batch operation button Ball. In this embodiment, the first function box Bx1 to the fourth function box Bx4 are arranged in two vertical rows and two horizontal rows (i.e., in a 2-by-2 matrices fashion) at a central area of the batch setting screen G2. It should be noted that the first function box Bx1 to the second function box Bx4 are sometimes referred to as "a first function box image to a fourth function box image", respectively.

The first function box Bx1 corresponds to the automatic braking function. The first function box Bx1 includes a frame line L1, a character group Na11 representing a function name (i.e., the automatic braking) assigned to the first function box Bx1, the first icon image SA1 corresponding to the automatic braking function, and a character group Na12 representing the setting states (an ON state or an OFF state) of the function (the automatic braking function) assigned to the first function box Bx1.

The second function box Bx2 corresponds to the lane departure alert function. The second function box Bx2 includes a frame line L2, a character group Na21 representing a function name (i.e., the lane departure alert) assigned to the first function box Bx2, the second icon image SA2 corresponding to the lane departure alert function, and a character group Na22 representing the setting states (an ON state or an OFF state) of the function (the lane departure alert function) assigned to the first function box Bx2.

The third function box Bx3 corresponds to the BMS function. The third function box Bx3 includes a frame line L3, a character group Na31 representing a function name (i.e., the blind spot monitor) assigned to the first function box Bx3, the third icon image SA3 corresponding to the BMS function, and a character group Na32 representing the setting states (an ON state or an OFF state) of the function (the BMS function) assigned to the first function box Bx3.

The fourth function box Bx4 corresponds to the PSB function. The fourth function box Bx4 includes a frame line L4, a character group Na41 representing a function name (i.e., the parking support brake) assigned to the first function box Bx4, the fourth icon image SA4 corresponding to the BMS function, and a character group Na42 representing the setting states (an ON state or an OFF state) of the function (the PSB function) assigned to the first function box Bx4.

The display ECU 30 sets a back ground BG1 of the first function box Bx1 to a first state described below, when the automatic braking function has been set in (at, to) the valid state. In contrast, the display ECU 30 sets the back ground BG1 of the first function box Bx1 to a second state described below, when the automatic braking function has been set in (at, to) the invalid state.

In this embodiment, the first state is a state in which a color of the back ground BG1 is a first color, and the second state is a state in which the color of the back ground BG1 is a second color that is different from the first color. For example, the first color is white, and the second color is red. In this manner, the display ECU 30 changes/switches the display modes of the first function Bx1, depending on whether the automatic braking function is in the valid state or in the invalid state.

The display ECU 30 changes/switches the display modes of each of the second function box Bx2 to the fourth function box Bx4 (each of the back grounds BG2 to BG4) depending on whether each of the driving support functions corresponding to the second function box Bx2 to the fourth function box Bx4 respectively is in the valid state or in the invalid state, in the same manner as the first function box Bx1. Thereby, the user can easily recognize whether each of the driving support functions corresponding to the second function box Bx2 to the fourth function box Bx4, respectively, has been set in (at, to) the valid state or the invalid state.

The batch operation button Ball includes the integrated symbol figure Sy. When the batch operation button Ball is tapped, the DSECU sets all of the driving support functions corresponding to the first function box Bx1 to the fourth function box Bx4 to the valid states. In other words, the DSECU switches the setting state of the driving support function which has been set in (at, to) the invalid state to the valid state from the invalid state, and maintains the setting state of the driving support function which has been set in (at, to) the valid state at the valid state, when the batch operation button Ball is tapped.

For example, it is now assumed that the automatic braking function, the lane departure alert function, and the PSB function have been set at the invalid states, and the BMS function has been set at the valid state, among the recommended driving support functions. In this case, as shown in the upper diagram of FIG. 5, the display ECU 30 displays the third function box Bx3 corresponding to the BMS function which has been set at the valid state in a third display mode in which the color of the back ground BG3 is set at the first color. The display ECU 30 displays "the first function box Bx1, the second function box Bx2, and the fourth function box4" corresponding to the driving support functions that have been set at the invalid states in a fourth display mode in which each of the colors of the back ground BG1, the back ground BG2, and the back ground BG4 is set at the second color.

When the batch operation button Ball is tapped under the assumption described above, the DSECU sets/switches all of the setting states of "the automatic braking function, the lane departure alert function, and the PSB function" that have been set at the invalid states to the valid states. In this case, as shown in the lower diagram of FIG. 5, the display ECU 30 displays all of the first function box Bx1, the second function box Bx2, the third function box Bx3, and the fourth function box Bx4 in the third display mode. That is, the display ECU 30 changes/switches each of the colors of the back ground BG1, the back ground BG2, and the back ground BG4, from the second color to the first color so that each of the colors of all of the function boxes Bx1 to Bx4 becomes the first color.

As understood from the above, the present apparatus can set (return) all of the recommended driving support functions to the valid states, through one touch operation to the batch operation button Ball. Therefore, the present apparatus can reduce a possibility that complicated operation is required for the user who wants to switch all of the setting states of the recommended driving support functions in the invalid states from the invalid states to the valid states. In other words, the present apparatus allows the user to change the all of the setting states of the recommended driving support functions to the valid states with a simple operation to the batch operation button Ball.

Furthermore, the batch operation button Ball is configured so as to include the integrated symbol figure Sy that is same figure as the integrated symbol figure Sy included the integrated telltale image Ar. Thereby, the present apparatus can allow the user to easily recognize that the batch operation button Ball is the button for comprehensively operating the setting states of the recommended driving support functions. It should be noted that the batch operation button Ball may be configured so as to include the figure which can remind the user of the integrated symbol figure Sy (or imply/suggest the integrated symbol figure Sy to the user), in place of the integrated symbol figure Sy. In this case, the present apparatus has the same effect as described above.

Furthermore, the present apparatus displays both of the batch operation button Ball including the integrated symbol figure (Sy) and the function boxes (Bx1 to Bx4) representing the respective setting states of the respective recommended driving support functions on the same screen at the same time. Thereby, the present apparatus can cause (or allows) the user to easily learn the recommended driving support functions whose states can be changed using the single batch operation button Ball.

Sensor Failure Notification Screen

Figure 6:
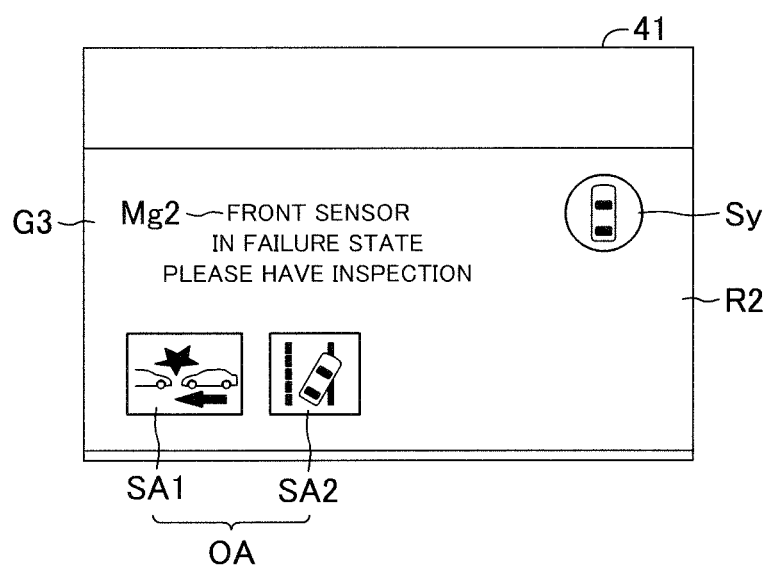
FIG. 6 is a diagram for explaining information displayed on the second display device.

As shown in FIG. 6, when sensor failure (trouble in the sensor) is detected, the meter ECU 40 generates images (failed function notification contents) for forming a sensor failure/trouble notification screen G3, and displays the generated images in a predetermined area R2 of the second display device 41. It should be noted that when a predetermined operation is performed by the user (for example, when an "unillustrated button for hiding the sensor failure notification screen G3" that is displayed on the first display device 31 is tapped), the images forming the sensor failure notification screen G3 are hidden. The ECUs (for example, the DSECU and the vehicle control ECU 20) connected to sensors always monitor/determine whether or not each of the sensors has failed, through well-known methods. Each of the ECUs transmits information specifying "the sensor that has failed and the driving support function using that failed sensor" to the meter ECU 40.

The sensor failure notification screen G3 includes a failure message Mg2, a failed function notification icon OA, and the integrated symbol figure Sy. It should be noted that the sensor failure notification screen G3 may include a figure which reminds the user of the integrated symbol figure Sy (implies/suggests the integrated symbol figure Sy to the user), in place of the integrated symbol figure Sy itself.

The failure message Mg2 includes a group of characters indicating/representing the sensor determined to have failed (the sensor in the abnormal state) and a suggestion/caution to urge the user to have the sensor determined to have failed inspected.

The failed function notification icon/mark OA includes one or more of the icon images corresponding to the respective driving support functions, each cannot be operable (cannot be utilized) due to the failure of the sensor.

For example, it is assumed that the automatic braking function and the lane departure alert function cannot be operable due to the failure of at least one of the front sensors (at least one of the radar sensors 11 on the front side of the vehicle SV and one of the camera sensors 12 on the front side of the vehicle SV). In this assumption, as shown in FIG. 6, the failed function notification icon OA includes the first icon image SA1 corresponding to the automatic braking function and the second icon image SA2 corresponding to the lane departure alert function.

In this manner, the present apparatus displays one or more of the icon images corresponding to the respective driving support functions, each of which cannot be used due to the failure of the sensor. Thereby, the present apparatus can cause (or allows) the user to easily recognize at a glance the recommended driving support functions, each of which cannot be used by the user and thus has been set in (at, to) the invalid state.

Furthermore, the present apparatus displays both of the failed function notification icon OA and the integrated symbol figure Sy together on the same screen at the same time. This can cause (or allows) the user to easily recognize the presence of one or more of the recommended driving support functions which have been set in (at, to) the invalid states (or to easily recognize the comprehensive setting state of the recommended driving support functions).

Specific Operation

The CPU of the meter ECU 40 (hereinafter, referred to as an "MCPU") is configured to execute a routine represented by a flowchart shown in FIG. 7, every time a predetermined time elapses.

Figure 7:
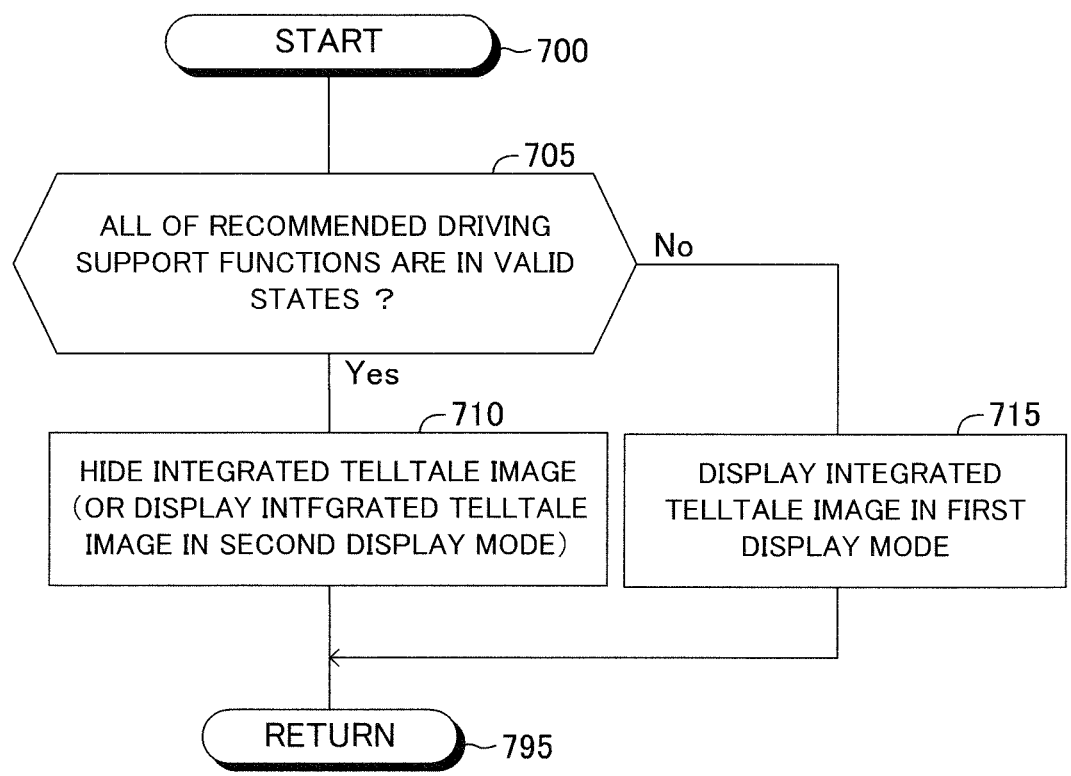
FIG. 7 is a flowchart showing a routine executed by a CPU of a meter ECU.

Therefore, when a predetermined timing (an appropriate time point) arrives, the MCPU starts processing from step 700 shown in FIG. 7 and proceeds to step 705 to determine whether or not all of the recommended driving support functions have been set at the valid states.

When all of the recommended driving support functions are at/in the valid states, the MCPU makes a "Yes" determination at step 705 and proceeds to step 710 to hide the integrated telltale image Ar if the integrated telltale image Ar is being displayed in the predetermined area R1. It should be noted that when the integrated telltale image Ar has already been hidden in the predetermined area R1, the MCPU maintains the integrated telltale image Ar in the non-display state at step 710. Thereafter, the MCPU proceeds to step 795 to tentatively terminate the present routine.

In contrast, when at least one of the recommended driving support functions which is at the invalid state is present, the MCPU makes a "No" determination at step 705 and proceeds to step 715 to display the integrated telltale image Ar in the predetermined area R1. It should be noted that when the integrated telltale image Ar has already been displayed in the predetermined area R1, the MCPU continues displaying the integrated telltale image Ar in the predetermined area R1 at step 715. Thereafter, the MCPU proceeds to step 795 to tentatively terminate the present routine.

Figure 8:
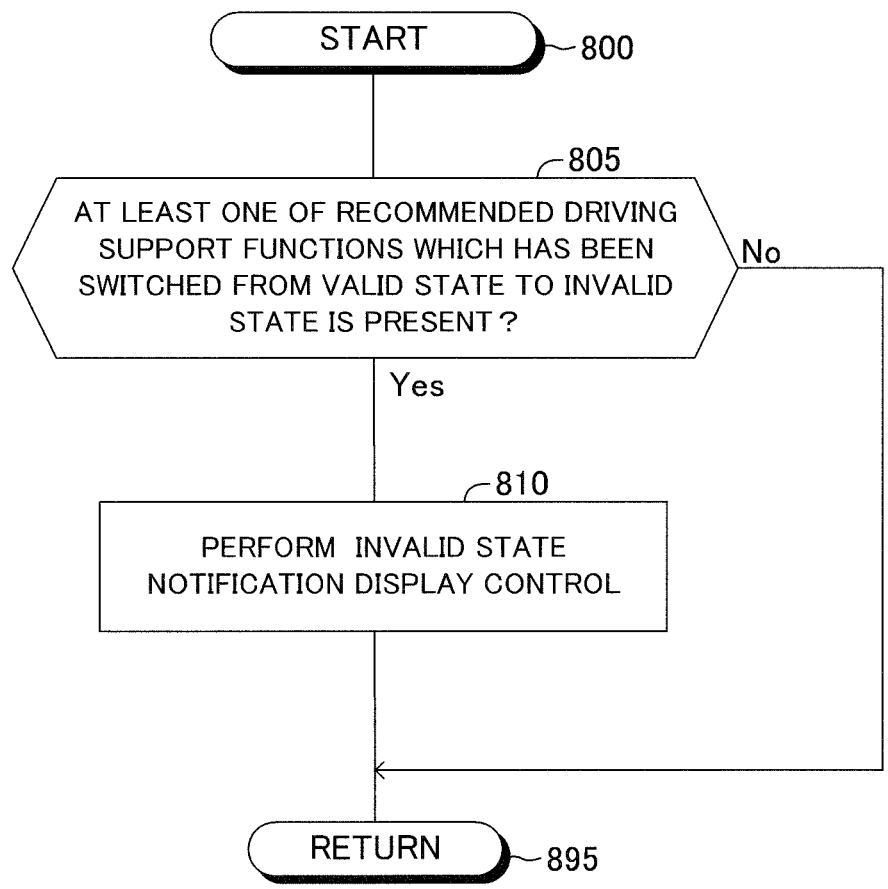
FIG. 8 is a flowchart showing a routine executed by the CPU of the meter ECU.

Furthermore, the MCPU is configured to execute a routine represented by flowchart shown in FIG. 8, every time a predetermined time t1 elapses. Therefore, when a predetermined timing (an appropriate time point) arrives, the MCPU starts processing from step 800 shown in FIG. 8 and proceeds to step 805 to determine whether or not at least one of the recommended driving support functions which has just been switched from the valid state to the invalid state is present within/for the last predetermined time t1 (i.e., in a period from a time point the predetermined time t1 before the present time point to the present time point).

When none of the recommended driving support functions which just have been switched from the valid state to the invalid state are present, the MCPU makes a "No" determination at step 805 and proceeds to step 895 to tentatively terminate the present routine. In contrast, when at least one of the recommended driving support functions which has just been switched from the valid state to the invalid state is present, the MCPU makes a "Yes" determination at step 805 and proceeds to step 810 and performs the above-described "invalid state notification display control". Thereafter, the MCPU proceeds to step 895 to tentatively terminate the present routine. The "invalid state notification display control" is the control to display the function invalid state notification image Nt (refer to FIG. 4B) in the predetermined area R2 of the second display device 41 for the predetermined displaying period (for the displaying time). When the invalid state notification display control is performed, the function invalid state notification image Nt is displayed on the second display device 41 for the predetermined displaying period.

Figure 9:
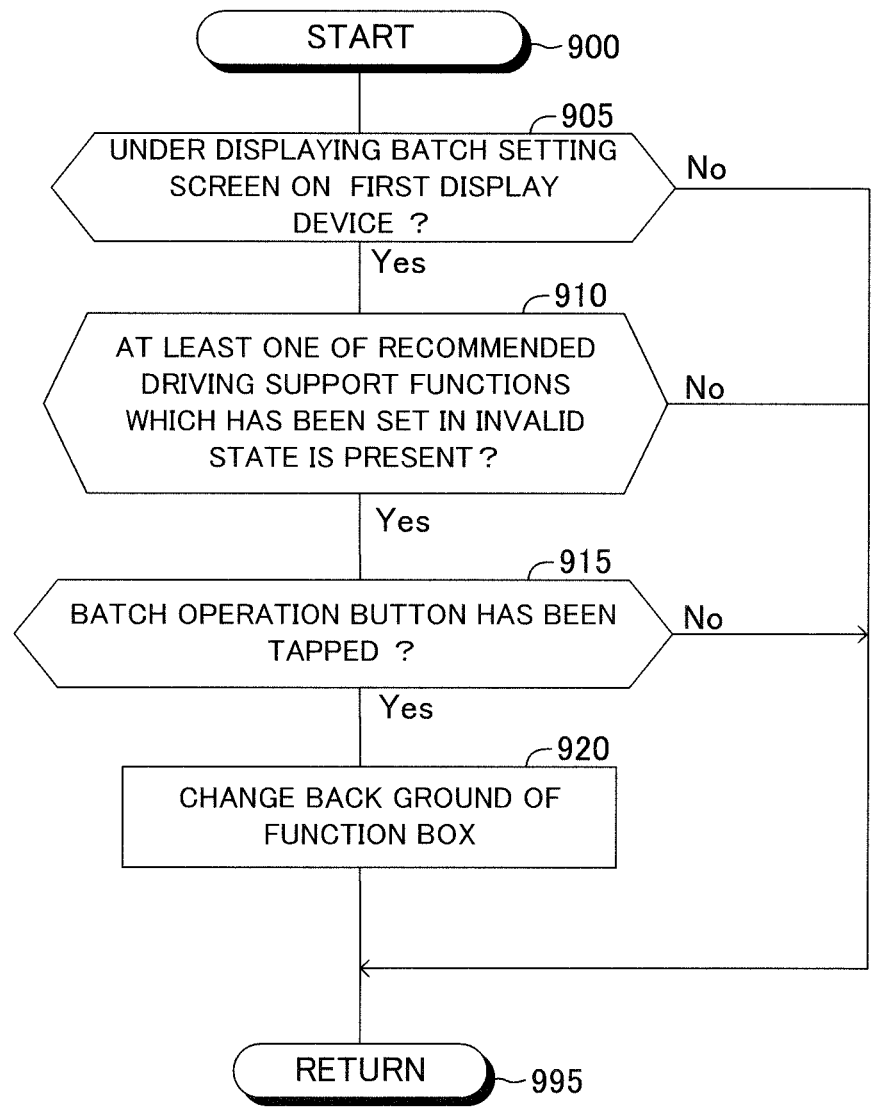
FIG. 9 is a flowchart showing a routine executed by a CPU of a display ECU.

Furthermore, the CPU (hereinafter, referred to as the "GCPU") of the display ECU 30 is configured to execute a routine represented by a flowchart shown in FIG. 9, every time a predetermined time elapses. Therefore, when a predetermined timing (an appropriate time point) arrives, the GCPU starts processing from step 900 shown in FIG. 9 and proceeds to step 905 to determine whether or not the GCPU is displaying the batch setting screen G2 on the first display device 31. It should be noted that the GCPU is configured to execute an unillustrated routine to monitor/determine whether or not a displaying condition of the batch setting screen G2 becomes satisfied. When the displaying condition of the batch setting screen G2 has become satisfied, the GCPU displays the batch setting screen G2 including the function boxes and the batch operation button Ball on the first display device 31. In this case, the GCPU sets the back ground colors of all of the function boxes that have been set at the valid states to the first color, and sets the back ground colors of all of the function boxes that have been set at the invalid states to the second color. Furthermore, the GCPU is configured to execute an unillustrated to monitor/determine whether or not a non-displaying condition of the batch setting screen G2 becomes satisfied. When the non-displaying condition of the batch setting screen G2 has become satisfied, the GCPU hides the batch setting screen G2.

When the GCPU is not displaying the batch setting screen G2 on the first display device 31, the GCPU makes a "No" determination at step 905 and proceeds to step 995 to tentatively terminate the present routine. In contrast, when the GCPU is displaying the batch setting screen G2 on the first display device 31, the GCPU makes a "Yes" determination at step 905 and proceeds to step 910 to determine whether or not at least one of the recommended driving support functions which has been set at the invalid state by the touch operation of the user is present.

When none of the recommended driving support functions which have been set at the invalid states are present, the GCPU makes a "No" determination at step 910 and proceeds to step 995 to tentatively terminate the present routine.

In contrast, at least one of the recommended driving support functions which has been set at the invalid state is present, the GCPU makes a "Yes" determination at step 910 and proceeds to step 915.

At step 915, the CPU determines whether or not the batch operation button Ball has been tapped. When the batch operation button Ball has not been tapped, the GCPU makes a "No" determination at step 915 and proceeds to step 995 to tentatively terminate the present routine. In contrast, when the batch operation button Ball has been tapped, the GCPU makes a "Yes" determination at step 915 and proceeds to step 920 to change the back ground (the back ground color) of the function box from the second color to the first color, the function box corresponding to the recommended support function that is caused to be switched from the invalid state to the valid state by the tapping on the batch operation button Ball. Thereafter, the GCPU proceeds to step 995 to tentatively terminate the present routine. In other words, the GCPU sets each of the back ground colors of all of the function boxes included in the batch setting screen G2 to the first color.

Figure 10:
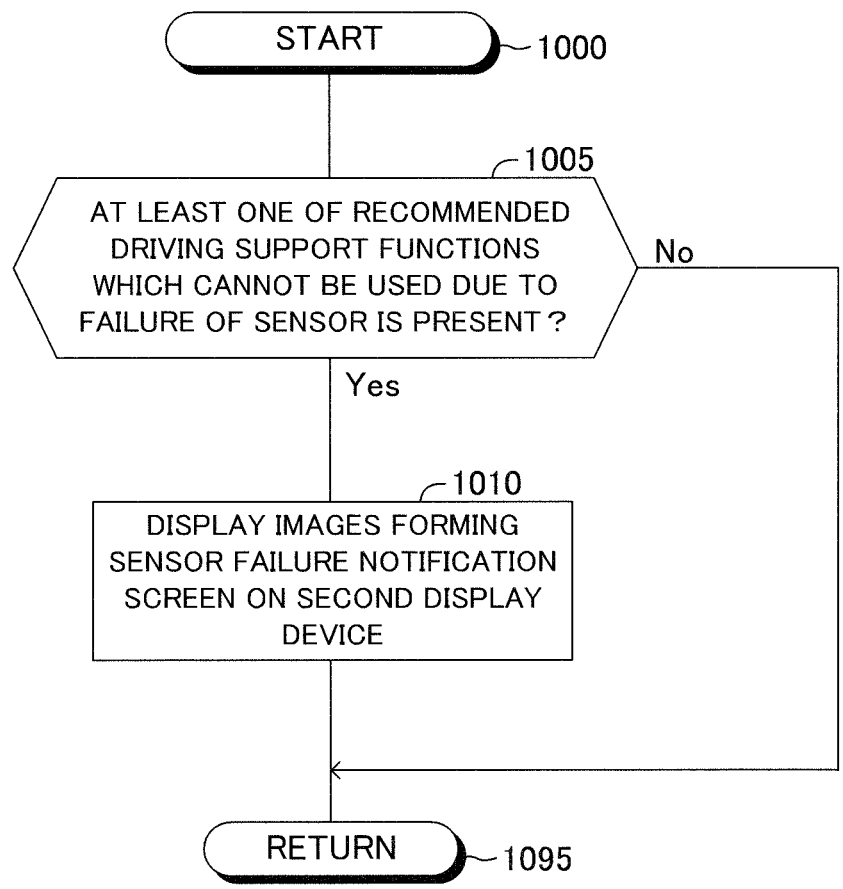
FIG. 10 is a flowchart showing a routine executed by the CPU of the meter ECU.

Furthermore, the MCPU is configured to execute a routine represented by a flowchart shown in FIG. 10, every time a predetermined time elapses. Therefore, when a predetermined timing (an appropriate time point) arrives, the MCPU starts processing from step 1000 shown in FIG. 10 and proceeds to step 1005 to determine whether or not at least one of the recommended driving support functions which cannot be used (or operable) due to the failure of the sensor is present.

When none of the recommended driving support functions which cannot be used due to the failure of the sensor are present, the MCPU makes a "No" determination at step 1005 and proceeds to step 1095 to tentatively terminate the present routine. In contrast, when at least one of the recommended driving support functions which cannot be used due to the failure of the sensor is present, the MCPU makes a "Yes" determination at step 1005 and proceeds to step 1010 to display the images (OA, Mg2, and Sy) forming (or included in) the sensor failure notification screen G3 (refer to FIG. 6) on the second display device 41. Thereafter, the MCPU proceeds to step 1095 to tentatively terminate the present routine.

As explained above, the embodiment and the modified examples of the present invention can cause (or allows) the user to easily recognize whether each of the recommended driving support functions is at/in the valid states or at/in the invalid states, and allow the user to switch all of the states of the recommended driving support functions to the valid states with the easy and simple operation. Although the embodiment and the modified examples of the present invention have been specifically described above, the present invention is not limited to the above embodiment or the modified examples, and further various modified examples based on the technical idea within the scope of the present invention can be employed. For example, although the number of the recommended driving support functions is four, the number of the recommended driving support functions is not limited to that number. Furthermore, the recommended driving support functions may include one or more of the driving support functions other than the above-described driving support functions.

What is claimed is:

1. A vehicle control apparatus comprising:
   a driving support device configured to perform a plurality of driving support functions for a vehicle;
   a display device; and
   a display control device,
   wherein,
   said driving support device is configured to be capable of setting individually each of some or all of said driving support functions to either a valid state or an invalid state, wherein one of said driving support functions is allowed to perform a corresponding driving support function when that one of said driving support functions is set in said valid state, and one of said driving support functions is not allowed to perform said corresponding driving support function when that one of said driving support functions is set in said invalid state; and
   said display control device is configured to:
      display an integrated telltale image including a specific graphic symbol on said display device in a first display mode when at least one of recommended driving support functions has been set in said invalid state, said recommended driving support functions including at least two of all of said driving support functions each of which can be set in either said valid state or said invalid state; and
      hide said integrated telltale image or display said integrated telltale image in a second display mode that is different from said first display mode on said display device, when all of said recommended driving support functions have been set in said valid states,
   wherein a plurality of said recommended driving support functions form a group of recommended driving support functions and said integrated telltale image includes said specific graphic symbol which is only hidden or displayed in said second display mode when all of the plurality of said recommended driving support functions of said group of recommended driving support functions are in said valid states.

2. The vehicle control apparatus according to claim 1, wherein,
   said display control device is configured to display a function invalid state notification image on said display device for a predetermined displaying time, when one of said recommended driving support functions has been switched from said valid state to said invalid state,
   wherein,
   said function invalid state notification image includes:
      a graphic symbol corresponding to said one of said recommended driving support functions that has been switched to said invalid state; and
      a character group representing by characters that said one of said recommended driving support functions that has been switched to said invalid state.

3. The vehicle control apparatus according to claim 1, wherein,
   said display control device is configured to display a specific display image on said display device, said specific display image including:
      a batch operation button to be operated in order for a user of said vehicle to switch each of all of said recommended driving support functions to said valid state, said batch operation button including at least one of said specific graphic symbol and another specific graphic symbol reminding said user of said specific graphic symbol; and
      function box images corresponding to said respective recommended driving support functions, each of said function box images including:
         at least one of:
            a first graphic symbol corresponding to one of said recommended driving support functions; and
            a first character group representing by characters said one of said recommended driving support functions; and
         at least one of:
            a second character group representing by characters indicating whether said one of said recommended driving support functions is either in said valid state or in said invalid state; and
            a second graphic symbol indicating whether said one of said recommended driving support functions is either in said valid state or in said invalid state.

4. The vehicle control apparatus according to claim 3, wherein,
   said display control device is configured to:
      set, when at least one of said recommended driving support functions is in said valid state, a back ground color of said at least one of said function box images corresponding to said at least one of said recommended driving support functions in said valid state to a first color; and
      set, when at least one of said recommended driving support functions is in said invalid state, said back ground color of said at least one of said function box images corresponding to said at least one of said recommended driving support functions in said invalid state to a second color different from said first color.

5. The vehicle control apparatus according to claim 3, wherein,
said display device includes:
a first display device; and
a second display device separate from said first display device; and
said display control device is configured to:
display said batch operation button and said function box images on said first display device; and
display said integrated telltale image on said second display device.

6. The vehicle control apparatus according to claim 3, wherein,
said display control device is configured to display, on said display device, a plurality of operation buttons to be operated in order for said user to switch each of said recommended driving support functions corresponding to said respective operation buttons to either said valid state or said invalid state, each of said operation buttons including a third graphic symbol which is the same as each of said first graphic symbols included in said function box images corresponding to said respective recommended driving functions.

7. The vehicle control apparatus according to claim 1, wherein,
said driving support device configured to perform said driving support functions using a sensor; and
said display control device is configured to display failed function notification contents on said display device, said failed function notification contents including:
fourth graphic symbols corresponding to one or more of said recommended driving support functions which cannot be used due to failure of said sensor; and
a character group including a name of said sensor in failure.

8. The vehicle control apparatus according to claim 7, wherein,
said display control device is configured to display said integrated telltale image in said first display mode on said display device when displaying said failed function notification contents on said display device.

9. The vehicle control apparatus according to claim 1, wherein,
said display control device is configured to display said integrated telltale image on said display device in said first display mode in such a manner that said integrated telltale image is displayed in a predetermined specific first color, and display said integrated telltale image on said display device in said second display mode in such a manner that said integrated telltale image is displayed in a predetermined specific second color that is different from said predetermined specific first color.

10. The vehicle control apparatus according to claim 1, wherein,
said display control device is configured to display said integrated telltale image on said display device in said first display mode in such a manner that said integrated telltale image is blinking, and display said integrated telltale image on said display device in said second display mode in such a manner that said integrated telltale image continues being displayed.

11. The vehicle control apparatus according to claim 1, wherein,
said display device includes:
a first display device; and
a second display device separate from said first display device; and
said display control device is configured to display a batch setting screen that includes function boxes corresponding to all of said respective recommended driving support functions, on said first display device, wherein each of said function boxes is configured to be able to indicate whether each of said respective recommended driving support functions is in said valid state or not; and
said display control device is configured to be able to display said integrated telltale image on said second display device even when said batch setting screen is being displayed on said first display device.

12. A display control method performed by one or more processors executing on a display control device and applied to a vehicle,
said vehicle including:
a driving support device configured to be capable of:
realizing a plurality of driving support functions; and
individually setting each of some or all of said driving support functions to either a valid state or an invalid state, wherein one of said driving support functions is allowed to perform a corresponding driving support function when that one of said driving support functions is set in said valid state, and one of said driving support functions is not allowed to perform said corresponding driving support function when that one of said driving support functions is set in said invalid state; and
a display device,
said display control method comprising:
displaying an integrated telltale image including a specific graphic symbol on said display device in a first display mode when at least one of recommended driving support functions has been set in said invalid state, said recommended driving support functions including at least two of all of said driving support functions each of which can be set in either said valid state or said invalid state; and
hiding said integrated telltale image or display said integrated telltale image in a second display mode that is different from said first display mode on said display device, when all of said recommended driving support functions have been set in said valid states,
wherein a plurality of said recommended driving support functions form a group of recommended driving support functions and said integrated telltale image includes said specific graphic symbol which is only hidden or displayed in said second display mode when all of the plurality of said recommended driving support functions of said group of recommended driving support functions are in said valid states.

* * * * *